United States Patent [19]

Cardenas et al.

[11] 4,012,358

[45] Mar. 15, 1977

[54] PIGMENTING FIBER GRADE POLYESTER

[75] Inventors: Cesar A. Cardenas, West Milford; John D. Bien, Livingston, both of N.J.; Salvatore Carangelo, Staten Island, N.Y.

[73] Assignee: Inmont Corporation, New York, N.Y.

[22] Filed: Apr. 11, 1975

[21] Appl. No.: 567,305

[52] U.S. Cl. .................. 260/40 R; 106/308 M; 260/40 P
[51] Int. Cl.² .......................................... C08K 9/04
[58] Field of Search ............... 260/40 R, 40 P; 264/211; 106/308 M

[56] References Cited
UNITED STATES PATENTS

| | | | |
|---|---|---|---|
| 3,582,384 | 6/1971 | Belde | 106/308 |
| 3,586,247 | 6/1971 | Perrins | 241/16 |
| 3,600,354 | 8/1971 | Kunze | 260/40 R |
| 3,694,402 | 9/1972 | Essam | 260/40 R |
| 3,879,341 | 4/1975 | Barkey | 260/40 P |

*Primary Examiner*—James H. Derrington

[57] ABSTRACT

Pigments are dispersed in fiber grade polyester by a two-step process:
a. pigment and polyethylene are mixed at 50 to 75% pigment concentration under intensive mixing conditions, and
b. the concentrate in (a) is reduced with fiber grade polyester under additional mixing conditions without substantial degradation of the polyester.

4 Claims, No Drawings

PIGMENTING FIBER GRADE POLYESTER

This invention relates to coloring fiber forming synthetic linear saturated polyesters, particularly polyethylene terephthalate with a predispersed pigment concentrate in polyethylene prior to extruding the polyester into fibers.

In accordance with the invention, a process is provided for the mass coloration of fiber forming synthetic linear polyester which comprises first mixing polyethylene, in suitable particulate form, with dry finely divided pigment, melting the polyethylene by applying heat and continuing mixing under intensive mixing conditions until a homogeneous mixture is obtained. By such mixing techniques it is possible to uniformly disperse up to 75% by weight, of pigment into the polyethylene. The pigment/polyethylene mixture is then combined with the polyester in suitable particulate form, the dry blend then is melted by applying heat, and mixing under intensive mixing conditions is continued with sufficient shear so that little or no heat need be applied to keep the polyester in a molten condition. Mixing in the high intensity mixer is continued until the desired degree of dispersion is obtained. By such mixing techniques it is possible to uniformly disperse up to 35% by weight of pigment into molten fiber grade polyester without adversely affecting the fiber forming properties of the polyester. At low pigment concentration, e.g. up to about 3% pigment, the dispersion may be extruded directly into filaments or fibers. At higher concentrations of pigment the dispersion is letdown with unpigmented fiber grade polymer to the desired pigment concentration for extrusion into fibers and filament.

When the concentration of pigment in the dispersion is on the order of 10 to 35%, such a concentrate is a very desirable embodiment of the invention and has a particularly important utility as a concentrate dispersion for coloring unpigmented fiber grade polyester to the desired intensity of color before spinning into filament. Such concentrates, for instance, when used to pigment fiber grade polyester can result in fibers containing as high as 3% pigment with only 1 to 3% of polyethylene. Such small amounts of polyethylene have substantially no effect on fiber properties. Of course at lower pigmentation the amount of polyethylene carried into the fiber is even less.

Dispersion on conventional two-roll mills is not satisfactory because of the high melting point of the polyester and the difficulties in controlling temperature.

Simply dry blending of pigment and polyester in powder form prior to fiber spinning has not been satisfactory because the resulting fiber or filament often is non-uniformly colored and agglomerates, resulting from non-uniform dispersion, may cause weak spots in the fiber. Also, the fiber manufacturers do not wish to use dry pigments because of the inherent difficulties associated with handling of such dry powders. Similar unsatisfactory results are often encountered when the pigment is added and dispersed in the polyester reactants prior to polymerization. Additionally, this technique may lead to undesirable side effects involving the pigment itself. This method also results in contamination of the polymer forming equipment with color.

A method whereby dry finely divided pigment is dry mixed with polyester in suitable particulate form and then melting the polyester by applying heat with continued mixing under intensive mixing is undesirable not only because of the inherent difficulties associated with the handling of dry powder but also the resulting dispersion quality is not sufficient to give long spinning filter pack life and fine denier filament. This is also the case in the prior art method of coloring fiber grade polyester by first dispersing the pigment in low molecular weight non-fiber grade polyester to form a concentrate and then adding the desired amount of concentrate to fiber grade polyester. Also, there is the disadvantage that the inclusion of the non-fiber grade polyester tends to degrade the mechanical properties of the resulting fiber or filament.

In this invention whenever the term "fiber grade polyester" is used, it will be understood to refer to a polyester material composed of at least 85% by weight of an ester of a dihydric alcohol and terephthalic acid. Such super polyesters will usually have a number average molecular weight of 9,000 to 26,000 and an intrinsic viscosity of at least 0.4 where the intrinsic viscosity ($\eta$) is defined as the limit ln ($\eta r/c$ as $c$ approaches zero, in which $r$ is the relative viscosity at 25°C. of a dilute solution of the polyester in a 60/40 phenol/tetrachloroethane solvent mixture divided by the viscosity of the solvent mixture in the same units at the same temperature and C is the concentration in grams of polyester per 100 ml of solution.

Pigments, in general, are operable in the invention provided they are the required properties; i.e. they must be capable of withstanding the high temperatures used in extruding the polyester (about 290° C. for polyethylene terephalate). They must be substantially non-subliming at extrusion or melt temperature and they must have acceptable light fastness, cleaning solvent fastness and fastness to perspiration and bleaches, for the particular end use of the extruded fiber. Inorganic pigments, in general, have these properties; many organic pigments are also operable and are a preferred type. Suitable organic pigments are phthalocyanine blue, phthalocyanine green, Red BR (color index No. 44), pigment violet (color index No. 23), Perylene Scarlet, Hostaperm Brown (color index No. 25), and the pigments described in prior art patents such as U.S. Pat. Nos. 3,487,041; 3,401,142; 3,417,048; 3,043,843; 3,424,708; 3,413,257; 3,410,821; 3,359,230 and 3,104,233.

For determining whether the dispersions are suitable for melt extrusion of fiber and filament, the filterability is measured as follows:

A sample of the dispersion is let down to 2% with unpigmented polyester and the let down dispersion is extruded through a laboratory extruder through a circular screen pack 1.0 inches in diameter consisting of 40 mesh, 100 mesh, 200 mesh, 325 mesh, 100 mesh, and 40 mesh in this order in the direction of flow. The dispersions are extruded at a temperature of approximately 300° C. and the dispersion is extruded at the rate of approximately 4.8 kg/hour. The filterability is determined by measuring the increase in pressure in pounds per square inch (psi) per weight of material extruded over a period of at least 60 minutes. The following formula is used:

$$F = \frac{P_f - P_i}{W}$$

where $F$ is the filterability in psi/kg, $P_i$ is the initial pressure in psi, $P_f$ is the final pressure after 60 minutes in psi and $W$ is the kilograms of extrudate collected in 60 minutes. Dispersions having a filterability of less than 18.5 psi/kilogram, as measured by this test, are suitable for making pigmented polyesters for extrusion into fibers and filaments.

In accordance with the invention 50 to 75%, preferably 60 to 70%, by weight, of pigment is mixed with the polyethylene in suitable particulate form, e.g. powder or pellet and the mixture is heated to melt the polyethylene and then mixed in molten condition in a high intensity kneader-type mixer until a uniform dispersion is obtained. A preferred high intensity mixer is the dough mixer. Using a dough mixer, a uniform dispersion is obtained in 10 to 20 minutes. The resulting dispersion of pigment in polyethylene, in powder or pellet form, is then mixed with the desired amount of fiber grade polyester in suitable particulate form, e.g. chip or pellets. The uniform blend of pigment, polyethylene and polyester, in molten form is then worked in kneader-type mixer equipped with extruder screws until a uniform high quality dispersion is obtained. Mixers of this type are described in the art, e.g. Encyclopedia of Polymer Science and Technology, Vol. 8, pages 541-5, Interscience Publishers, 1968. The mixer used in this step of the process is preferably a twin screw extruder. The high quality dispersion is extruded in filament or fiber or, if it is a concentrate dispersion it is converted into pellets, powders or granules, suitable for use in pigmenting fiber forming polyester prior to melt spinning.

The intensive mixing of pigment and polyethylene in the first stage of the process should be controlled so as not to chemically degrade the polyethylene and/or pigment. Preferably conventional polyethylene heat stabilizers are used to protect against degradation of the polyethylene. Intensive mixing of the pigment-/polyethylene/polyester mixture should also be controlled so as not to chemically degrade the pigment, polyethylene and polyester. It may be desirable, for instance, to cool the mixture to prevent excessive rise in temperature, or carry out the mixing in an inert atmosphere, such as under a blanket of nitrogen.

In a preferred embodiment of the invention a mixture of 60 to 70 parts of pigment and 40 to 30 parts of low density polyethylene powder or pellets (as available commercially) is heated and mixed in a dough mixer with the polyethylene being maintained in a molten condition. The polyethylene has a melt index of 20 to 300. Mixing is continued for 10 to 20 minutes or until a homogeneous mixture is obtained. The mixture is then cooled to solidify the polyethylene and then reduced to a suitable particulate form for handling, e.g. to particles no longer than ½ in. in diameter. Next, 20 to 50 parts of the mixture are combined with 80 to 50 parts of particulate fiber grade polyester and fed continuously to an intensive mixer, preferably a twin screw extruder type, at such a rate that the dispersion exiting from the extruder has a filterability less than 18.5 psi/-kilogram as defined herein above.

A twin screw extruder is an intensive mixer comprised of two co-rotating intermeshing screws. The mixer is divided into zones wherein controlled amounts of heating, cooling and mixing can be applied to the mixture of pigment/polyethylene/polyester as it is conveyed through the mixer. A very desirable mixer of this type is the Werner-Pfleiderer twin screw extruder, Model ZSK type. The first zone of the extruder is heated to melt the polyethylene and polyester; the mixture of pigment and molten polymer then passes into the intensive mixing zone wherein the extruder screws are arranged to apply high shear to the mixture, which may be sufficient in fact to maintain the polymers in a molten condition. Cooling may be applied if necessary to keep the temperature from rising above about 280° C., or above the point that degrades the polymers. From the high shear zone the dispersion passes to the extrusion zone where heat may again be applied if necessary, to maintain the dispersion at an extrudable viscosity. It is usually extruded in the shape of a strand which is then cut into pellets for convenience in handling. The Model ZSK type extruder machine is equipped with vents between the different zones so that vacuum can be applied, if necessary, or if desired to remove traces of volatile material; e.g., water. Concentrate dispersions prepared by this preferred embodiment shows little decrease in intriusic viscosity of the polyester component, usually less than 0.05 units and never more than the 0.1 unit which is acceptable by the fiber spinning industry. The IV of the pigmented polyester is determined in the same way as the unpigmented polyester, except that calculating the IV the weight of pigment in the measured sample is not used.

The following examples, in which the parts are by weight unless otherwise stated, are given to further illustrate the invention.

EXAMPLE 1

29.7 Parts of a commercial grade of low density polyethylene (melting point 100° C. and Melt Index 250), and 0.3% of 3-methyl-6-tertiary butyl phenol (heat stabilizer for polyethylene) were melted in a dough mixer by heating, then 70 parts of furnace carbon black pigment was added to the melt and mixed in until the carbon black was completely incorporated into the molten polyethylene; i.e. 10 to 15 minutes. The mixture of pigment and polyethylene was cooled to solidify the polyethylene and then broken up into particles suitable for feeding into the twin screw extruder. The mixture was then fed continuously and simultaneously with Vitel 3801 chip (a fiber grade polyester having an intrinsic viscosity of 0.62) to the first zone of a Model ZSK-53 Werner-Pfleiderer twin screw extruder at a rate of 0.46 pounds per minute for the polyethylene/-carbon black mixture and 0.86 pounds per minute for the polyester. Heat was applied and maintained in all zones of the extruder at such a temperature that 85 to 95% of maximum torque was obtained (equivalent to 288 to 342 ft. lbs.). Ordinarily temperatures no higher than about 280° C. are used. The intrinsic viscosity of the polyester in the concentrate was 0.58. The concentrate had a filterability of 6.0 psi per kilogram. It was evaluated further as to dispersion quality as follows:

The concentrate was extended, or "letdown" to 2% pigment, by weight, with fiber grade polyester identical with that used in preparing the concentrate, by melt extrusion in an extruder commonly used for mixing small amounts of solids with molten material. A microscope slide was prepared from this extended material by placing a small amount of the material between two glass slides, heating to a temperature of 250° – 275° C. and pressing into a thin film. The slide prepared in this manner was then observed under 250 × magnification. The degree of pigment dispersion was observed to be excellent; i.e., there were substantially no pigment particles larger than 5 microns in diameter, the background was composed of particles less than one micron. The color uniformity was excellent. Continuous polyester filament of a fine denier 2.5 dpf. was prepared with this concentrate at a pigment level of 2.5%, by weight, with excellent properties.

EXAMPLE 2

Example 1 was repeated except that phthalocyanine blue pigment was substituted for the carbon black and the ratio of polyethylene to pigment was 25 to 75 parts. A concentrate color dispersion having a filterability of 15 psi/kg. was obtained. There was substantially no decrease in intrinsic viscosity of the polyester indicating that the polyester was not degraded. The dispersion was useful for pigmenting fiber grade polyester to produce melt spun fibers containing up to 3% pigment. At such pigmentation the amount of polyethylene in the spun fiber is only 1% and has no noticeable effect on the properties of the fiber.

EXAMPLE 3

Example 1 was repeated using the same polyethylene to pigment ratio as in Example 2, except that the pigment used was a vat red. A red concentrate dispersion having a filterability of 10 psi/kg was obtained and of good quality with substantially no increase in intrinsic viscosity of the polyester indicating that the fiber grade polyester is not degraded.

EXAMPLE 4

A violet concentrate was obtained by substituting carbazoll violet pigment for phthalocyanine blue of Example 2. The dispersion had a filterability of 15 psi/kg. The polyester component had an intrinsic viscosity such that the fiber grade polyester had not degraded.

EXAMPLE 5

A navy was obtained by substituting a blend of several pigments for the phthalocyanine blue in Example 2. The dispersion had a filterability of 18 psi/kg and of good quality. The polyester component had an intrinsic viscosity that indicated the fiber grade polyester had not degraded. The physical properties of fiber prepared by using the dispersion to pigment the polyester prior to spinning were very good. Fabrics woven from the colored fibers show good color uniformity.

What is claimed:

1. A method of forming a concentrate mixture of pigment, polyethylene and fiber grade polyester comprising:
   a. mixing 50 to 75 parts of pigment with 50 to 25 parts of dry, particulate polyethylene having a melt index of 20 to 300,
   b. melting the polyethylene and continuing mixing for 10 to 20 minutes,
   c. cooling the mixture of pigment and polyethylene to solidify the polyethylene,
   d. converting the solidified mixture of pigment and polyethylene to particulate form,
   e. mixing 1 part of the particulate mixture of pigment and polyethylene with 1 to 4 parts of particulate fiber grade polyester,
   f. heating the mixture of pigment, polyethylene, and polyester to about 280° C., in a twin-screw extruder type of intensive mixer, and
   extruding the mixture of pigment, polyethylene and polyester in the extruder at a temperature no higher than about 280° C. until the mixture has a filterability of less than 18.5.

2. A method of forming a concentrate mixture of pigment, polyethylene and fiber grade polyester comprising:
   a. mixing 60 to 70 parts of pigment with 40 to 30 parts of dry, particulate polyethylene having a melt index of 20 to 300,
   b. melting the polyethylene and continuing mixing for 10 to 20 minutes,
   c. cooling the mixture of pigment and polyethylene to solidify the polyethylene,
   d. converting the solidified mixture of pigment and polyethylene to particulate form,
   e. mixing 1 part of the particulate mixture of pigment and polyethylene with 1 to 4 parts of particulate fiber grade polyester,
   f. heating the mixture of pigment, polyethylene, and polyester to about 280° C. in a twin-screw extruder type of intensive mixer, and
   g. extruding the mixture of pigment, polyethylene and polyester in the extruder at a temperature no higher than about 280° C. until the mixture has a filterability of less than 18.5.

3. A concentrate mixture of pigment in polyethylene and fiber grade polyester produced by the method of claim 1.

4. A concentrate mixture of pigment in polyethylene and fiber grade polyester produced by the method of claim 2.

* * * * *